3,105,694
MOBILE SPREADER
Martin Rausch, Industriestrasse 6, Marburg an der (Lahn), Germany
Filed Dec. 8, 1960, Ser. No. 74,708
Claims priority, application Germany Dec. 8, 1959
5 Claims. (Cl. 275—8)

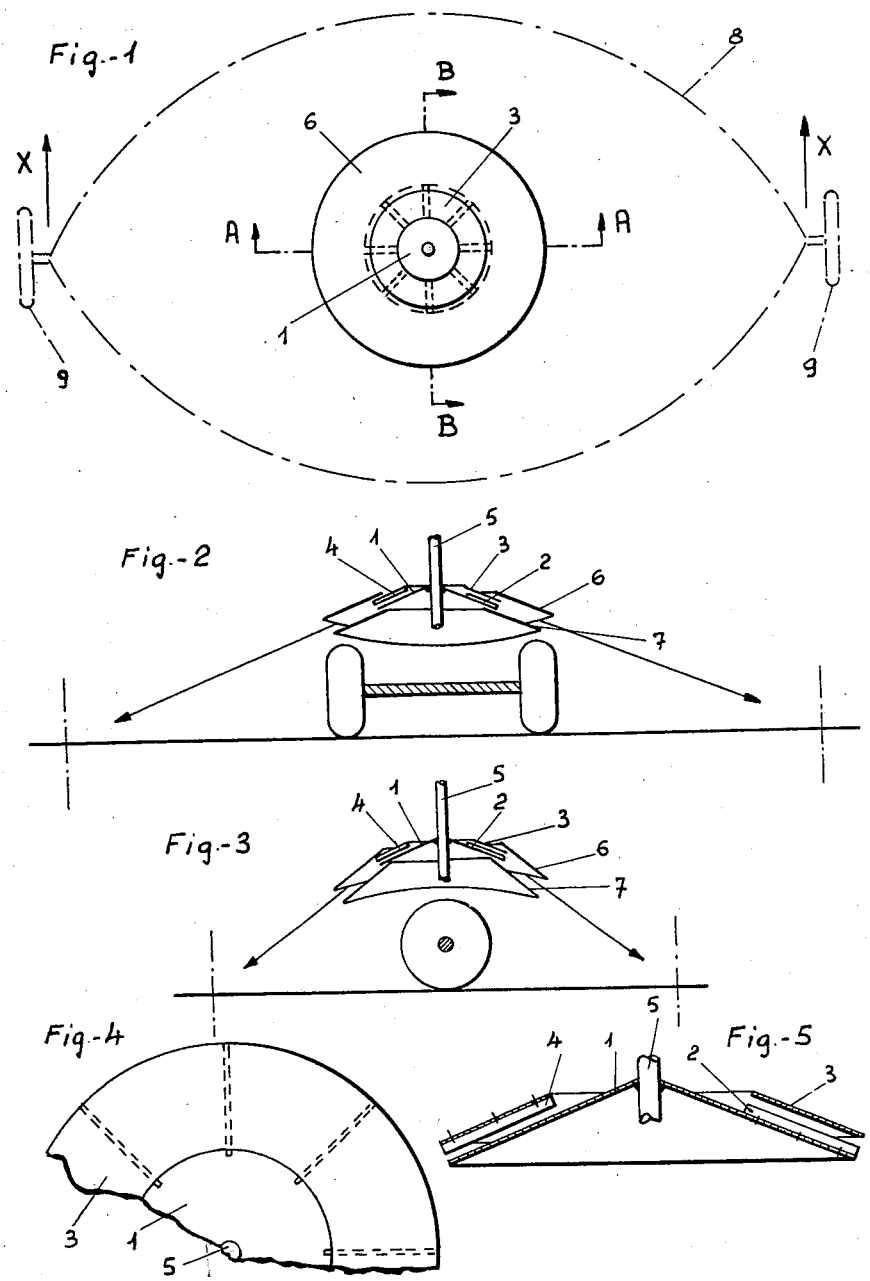
INVENTOR:
MARTIN RAUSCH
McGlew and Toren
ATTORNEYS

This invention concerns mobile agricultural spreaders.
Although known simple flat centrifugal discs which rotate about a vertical axis beneath a container for material to be spread cannot give a uniform or even approximately uniform distribution of material, unless additional special devices are provided, they are nevertheless frequently used in agriculture for the spreading of mineral fertilizer. Although the purchase price is low, such devices are not economical because their specific output is very high. These disadvantages are also found in known devices of the kind provided with single conical centrifugal discs, or with flat centrifugal discs furnished with a flat top plate. In all the aforesaid cases, in practice the material to be spread is projected horizontally, so that the distribution of the material is uneven and therefore very uneconomic. Distributing devices giving more even distribution are, on the other hand, either much more expensive or give insufficient specific output. For profitable working, however, agriculture requires not only a high daily output but, above all, a uniform distribution of mineral fertilizer with a minimum possible expenditure of human labour.

The distributing device according to the invention, more particularly described hereinbelow and illustrated in the drawing with reference to one exemplified embodiment, is structurally simple and at the same time very efficient, and so satisfactorily distributes the material to be spread that in this respect it closely approaches the most expensive distributing devices.

The invention provides a mobile agricultural spreader having, for example, a hopper-shaped container for the material to be spread from which the material is fed to a conical centrifugal disc disposed beneath the container and rotating horizontally about a vertical axis, and the spreader is characterised in that the centrifugal disc is provided with a likewise conical top plate, the centre of which is open, and which defines, between itself and the centrifugal disc, a conical space through which the material passes.

The invention will be described further, by way of example, with reference to the accompanying drawings which, for the sake of clarity, are restricted to the novel parts only of the device according to the invention, the container for the material and means for feeding the material to the centrifugal disc, and all other parts not relevant to the invention, not being illustrated.

In the drawings:
FIG. 1 is a plan view of a spreader according to the invention, the two arrows X indicating the direction of travel thereof;
FIG. 2 is a section, transversely to the direction of travel, taken on the line A—A of FIG. 1;
FIG. 3 is a section, parallel to the direction of travel, taken on the line B—B of FIG. 1;
FIG. 4 is a plain view, on a larger scale, of the centrifugal distributor of the spreader of FIGS. 1 to 3; and
FIG. 5 is a diametric section corresponding to FIG. 4.

The agricultural spreader according to the invention comprises a centrifugal distributor which, as shown in the five figures, consists of the bottom conical centrifugal disc 1, which is preferably closed at the top and which has projector ribs 2 fastened thereon, a top plate 3, which is a frusto-conical form (i.e. it is open at the centre), and projector ribs 4 disposed on the underside of said top plate 3. Both the projector ribs 2 and the projector ribs 4 may be U-shaped in cross-section, and these ribs extend radially of the respective centrifugal discs so that the projector ribs form, within the conical space between the disc 1 and top plate 3, guide passages for the material to be spread. The projector ribs 2 and 4 may extend the entire distance between the top surface of the centrifugal disc 1 and the bottom surface of the top plate 3, and be fastened to both the disc 1 and plate 3 so that they constitute a connection between these two parts.

The centrifugal disc 1 is rigidly connected to a central vertical shaft 5, while the top plate 3 is rigidly fastened to the centrifugal disc 1 either by means of the projector ribs 2 and 4 respectively or, possibly, by means of webs (not shown) so that it is carried by and rotated with said centrifugal disc 1.

A further component part of the preferred embodiment of the invention is deflector means for the material being spread, and said deflector means consists of a top deflector ring 6 and a bottom deflector ring 7. These two deflector rings surround the centrifugal disc and the top plate, the top ring 6 extending, at the centre, to a point above the outer edge of the top plate 3 whilst the bottom deflector ring 7 extends to a point below the centrifugal disc 1. Both deflector rings are advantageously arranged in substantially parallel relationship to one another and extend substantially in the same direction as the conical space between the centrifugal disc 1 and top plate 3 (see FIGS. 1, 2 and 3).

The complete spreader according to the invention is shown as a superstructure of a single-axled vehicle in the exemplified embodiment shown. The container for the material to be spread is advantageously situated centrally above the centrifugal disc concentrically of the shaft 5, but is not shown. The centrifugal disc 1 is driven from its shaft 5 preferably from an off-take shaft of a tractor by which the spreader is drawn, while driving power for feeding the material to be spread from its container to the centrifugal disc 1 is advantageously derived from a driving source linked to the road, for example the road wheels of the spreader.

The distributing process is effected in the following manner:

From the bottom region of the container the material to be spread passes, preferably in an annular flow of even thickness, all round and concentrically to the centrifugal disc 1, through the central opening in the top plate 3, the centrifugal disc rotating at approximately five hundred revolutions per minute. The centrifugal disc 1 draws the material into the conical space between itself and the plate 3, because the projector ribs 2 and 4 cause air displacement, after the style of a fan, in an eccentric conical direction, which projects said material, with the assistance of the projector ribs 2, 4 and with appropriate guidance, by the conical construction of the disc 1 and plate 3, circularly in a trajectory extending downwardly at an angle, between the two adjacent deflector rings 6 and 7, towards the surface to which it is to be applied.

The deflector rings 6, 7 are intended to keep the stream of material condensed, as far as is possible, so as to prevent it breaking or escaping in the upward or downward directions. The direction of flow of the material extending downwardly at an angle all around is determined by the shape of the centrifugal disc 1 and the deflector rings 6, 7 and thus may be made adjustable if required by appropriate construction thereof. Since, as shown in the exemplified embodiment illustrated, the distribution area 8 of material meeting the soil will normally be required to be similar to an ellipse, the deflector rings 6, 7 extend correspondingly more steeply in the downward direction at the front and rear considered in the direction of travel (see FIG. 3) than on the left and right (see FIG. 2), with a corresponding gradual symmetrical transition from the steeper to the less steep direction.

The material used for the deflector rings 6, 7 may be rigid sheet metal, but since many materials for distribution will stick on such material, these rings 6, 7 are preferably made of a material which is not rigid but is flexible, which does not oxidise or rust, and which does not attract water of condensation even with high air humidity or at low temperatures, for example, flexible polyvinylchloride plastic in thin sheet form.

The most significant advantage of the invention is that, unlike the simple known devices, the material distribution is not projected by the centrifugal disc to uncontrollable distances, the trajectory length and direction at least to the left and right of the direction of travel being influenced in different ways by the speed of rotation of the centrifugal disc, the prevailing wind, the structure and nature and specific gravity of the material for spreading, and other external influences, but is distributed uniformly over a distribution area which is adjustable in direction and width. This enables the direction of distribution of the material being spread to be influenced in such manner that it meets the ground in an oval elliptical area 8, the longitudinal axis of which is situated transversely to the direction of travel. As is known, this manner of distribution gives the most uniform distribution possible with centrifugal discs, provided that the device is propelled in the direction indicated by the arrows X in FIG. 1, (i.e. parallel to the minor axis of the ellipse) during the distributing operation. If, however, it is not desired that the material should be distributed uniformly over the surface, for example if the left hand and right hand edges (in the direction of travel) of the surface to be covered are to receive more material than the central region, then the trajectory of the material may be so adjusted that the region where the material meets the soil corresponds to a substantially circular ring. This is achieved, for example, if distribution is carried out using the device without the two deflector rings 6, 7.

With the arrangement of the invention it is now possible to determine the direction of distribution of the material either symmetrically or asymmetrically all round, as required, and hence to vary both the amount distributed and the working or distributed width.

When it is desired to prevent the separation of the components of a mixture of materials of different grain sizes and nature, it is possible with the spreader of the invention to give the material to be spread a very high speed of distribution, by increasing the circumferential speed of the centrifugal disc 1, without impairing the planned distribution width and density as adjusted, although it is well known that this would occur with single centrifugal discs.

It should also be pointed out that to project the material in a trajectory extending downwardly at an angle it is not absolutely necessary to provide the deflector rings 6, 7. This result can also be obtained simply with the centrifugal disc 1 and top plate 3 according to the invention, although in this instance the area where the material meets the soil is in the form of a circle. The deflector rings 6, 7 offer the possibility of guiding the material in a circular, oval and even asymmetrical areas on to the surface to be covered.

While the deflector rings 6, 7 extend around the centrifugal disc in the exemplified embodiment illustrated, it is possible to use portions only of such ring or to dispense with one of the two deflector rings 6 or 7 completely or partially. Thus, for example, it is possible to obtain an oval distribution area 8 if the top deflector ring 6 is dispensed with and if only portions of the deflector ring 7 are provided on the left and right of the direction of travel.

A very considerable advantage is also offered by the possibility of increasing the distribution of working width simply by raising the device and reducing it by lowering the said device, while at the same time if the amount of material distributed is maintained constant the density of distribution can be reduced by raising the device and increased by lowering the device. Alternatively, instead of lowering and raising the device as a whole in relation to the ground, just the centrifugal disc 1 with the upper plate 3 may be arranged to be adjustable as to height in relation to the deflector rings 6, 7, or vice versa. To increase the versatility of the device it is also possible, in known manner, to provide a wind shield or baffle, the shape of which preferably corresponds to the shape of the distribution area. In the example illustrated this wind shield would have the shape of the distribution area 8 of FIG. 1. The object of this is that, in the event of a high wind, additional protection is given against the material being distributed beyond the desired width, or, conversely, it guards against the possibility of material not completely reaching the outer edge of the area of soil to be covered. Where the spreader is comparatively large and hence provides an appropriately large distribution area, it is advisable to provide the outer ends of the wind shield with supporting wheels 9 or supporting skids which are shown in FIG. 1 in dot-dash lines. The use of such supporting wheels, which may also be disposed directly on the outer lateral ends of the wind shield, also has the advantage that they may be arranged to leave, on the ground, a track mark which facilitates joining up with the next adjacent width when the latter is covered by the spreader. When the soil is hard, the wheels 9, or at least one of them, may be provided with a toothed edge or be constructed as a cutter disc or plate-type harrow, to enable a sufficiently clear track mark to be left on the ground.

The device is not intended to be used only for mineral fertilizer distribution in agriculture, but, inter alia, also for lime distribution, the dusting of pest-control agents, broadcast sowing, the distribution of liquid fertilizer and, for example, also for the distribution of sand and thawing salts on roads, and also the distribution of gravel and ballas in road-building.

The device need not necessarily be constructed as an independent vehicle but may also be installed in other vehicles or be attached to such vehicles, for example tractors, while the driving power for the supply of material from the container to the centrifugal disc can be derived from the tractor.

I claim:

1. A mobile spreader for distributing manure and like materials comprising a conical centrifugal disc arranged to receive material for spreading from above, and to be rotated about a vertical axis, a stationary frusto conical top plate arranged a short distance above said centrifugal disc so as to define above the latter a conical space for the passage of the material, a plurality of projector ribs disposed in said conical space and extending at an angle to said axis, said ribs being secured for rotation with said centrifugal disc, stationary downwardly sloping upper and lower dished circular deflector rings disposed respectively above and below the peripheral discharge portion of said centrifugal disc so as to define a deflector passage extending radially outwardly of said disc and top plate and through which the material is projected by said centrifugal disc, and frame means, including wheels, supporting said centrifugal disc, top plate and deflector rings.

2. A mobile spreader as set forth in claim 1 wherein said deflector rings slope more steeply at the front and rear considered with respect to the direction of travel of the spreader, than at the sides thereof.

3. A mobile spreader as set forth in claim 1 wherein said deflector rings are constructed of flexible sheet material.

4. A mobile spreader as set forth in claim 1 wherein said centrifugal disc is adjustable vertically relative to said deflector rings.

5. A mobile spreader as set forth in claim 1 wherein said centrifugal disc, together with said deflector rings, is adjustable vertically.

References Cited in the file of this patent

UNITED STATES PATENTS

| | | |
|---|---|---|
| 1,117 | Smith | Apr. 10, 1839 |
| 145,112 | Lazarevitch | Dec. 2, 1873 |
| 351,988 | Lord | Nov. 2, 1886 |
| 557,010 | Morse | Mar. 24, 1896 |
| 842,073 | Browning | Jan. 22, 1907 |
| 922,028 | Parrish | May 18, 1909 |
| 1,164,579 | Curtis | Dec. 14, 1915 |
| 1,375,799 | Owen | Apr. 26, 1921 |
| 1,862,396 | Gray et al. | June 7, 1932 |
| 2,586,492 | Ulrich | Feb. 19, 1952 |
| 2,672,347 | Rausch | Mar. 16, 1954 |
| 2,946,597 | Simonsen | July 26, 1960 |